(12) United States Patent
Zhao et al.

(10) Patent No.: US 12,090,588 B2
(45) Date of Patent: Sep. 17, 2024

(54) AUTOMATIC LOCKING DEVICE AND ASSEMBLING APPARATUS THEREWITH

(71) Applicant: FULIAN TECHNOLOGY (SHANXI) CO., LTD., Taiyuan (CN)

(72) Inventors: Yun Zhao, Taiyuan (CN); Wang Wang, Taiyuan (CN); Zhan-He Su, Taiyuan (CN); Ming-Yu Guo, Taiyuan (CN); Jian Liu, Taiyuan (CN); Wen-Feng Zhao, Taiyuan (CN); Zhao-Chen Li, Taiyuan (CN); Dong-Bo Pei, Taiyuan (CN)

(73) Assignee: FULIAN TECHNOLOGY (SHANXI) CO., LTD., Taiyuan (CN)

( * ) Notice: Subject to any disclaimer, the term of this patent is extended or adjusted under 35 U.S.C. 154(b) by 18 days.

(21) Appl. No.: 18/207,160

(22) Filed: Jun. 8, 2023

(65) Prior Publication Data
US 2024/0001497 A1    Jan. 4, 2024

(30) Foreign Application Priority Data

Jun. 30, 2022   (CN) .......................... 202210773017.5

(51) Int. Cl.
   *B23P 19/00*   (2006.01)
(52) U.S. Cl.
   CPC .................. *B23P 19/007* (2013.01)

(58) Field of Classification Search
CPC ......... B23P 19/00; B23P 19/04; B23P 19/001; B23P 19/007; B23P 19/004
See application file for complete search history.

(56) References Cited

FOREIGN PATENT DOCUMENTS

| CN | 107649596 A | * | 2/2018 | ............. B21D 39/00 |
| CN | 109079500 A | * | 12/2018 | ............. B23P 19/00 |

* cited by examiner

*Primary Examiner* — Bayan Salone
(74) *Attorney, Agent, or Firm* — ScienBiziP, P.C.

(57) ABSTRACT

An automatic locking device for assembling a part to a workpiece is provided. The device includes a feeding mechanism, a fixture mechanism, a loading and unloading mechanism, a lifting mechanism, a rotating mechanism, and a locking mechanism. The feeding mechanism feeds the part to the fixture mechanism. The loading and unloading mechanism places the workpiece on the part. The lifting mechanism lifts up the fixture mechanism together with the part and the workpiece. The rotating mechanism rotates the fixture mechanism. The locking mechanism locks the part to the workpiece after the part and the workpiece are rotated by the rotating mechanism. The automatic locking device integrates multiple functions in a single station, reduces the number of the work stations and operatives, lowers the cost, and improves accuracy of the assembly. An assembling apparatus including the automatic locking device is also provided.

13 Claims, 14 Drawing Sheets

AUTOMATIC LOCKING DEVICE AND ASSEMBLING APPARATUS THEREWITH

CROSS-REFERENCE TO RELATED APPLICATION

This application claims priority to China Application No. 202210773017.5, having a filing date of Jun. 30, 2022, filed in China State Intellectual Property Administration, the entire contents of which are hereby incorporate by reference.

FIELD

The subject matter relates to assembling technologies, and more particularly to an automatic locking device and an assembling apparatus with the automatic locking device.

BACKGROUND

During the manufacturing of an electronic device such as a smart phone, at least one small part needs to be assembled onto a workpiece of the electronic device. Such assembling processes require cooperation of multiple stations and operatives, and thus are high in cost. Furthermore, during assembling, the workpiece is first positioned by a fixture or a clamp, and the part is then placed on and assembled to the workpiece. However, the part may slightly deviate from its original position on the workpiece before being assembled, which reduces the quality of the final product.

BRIEF DESCRIPTION OF THE DRAWINGS

Implementations of the present technology will now be described, by way of example only, with reference to the attached figures.

DETAILED DESCRIPTION

Figure 1:
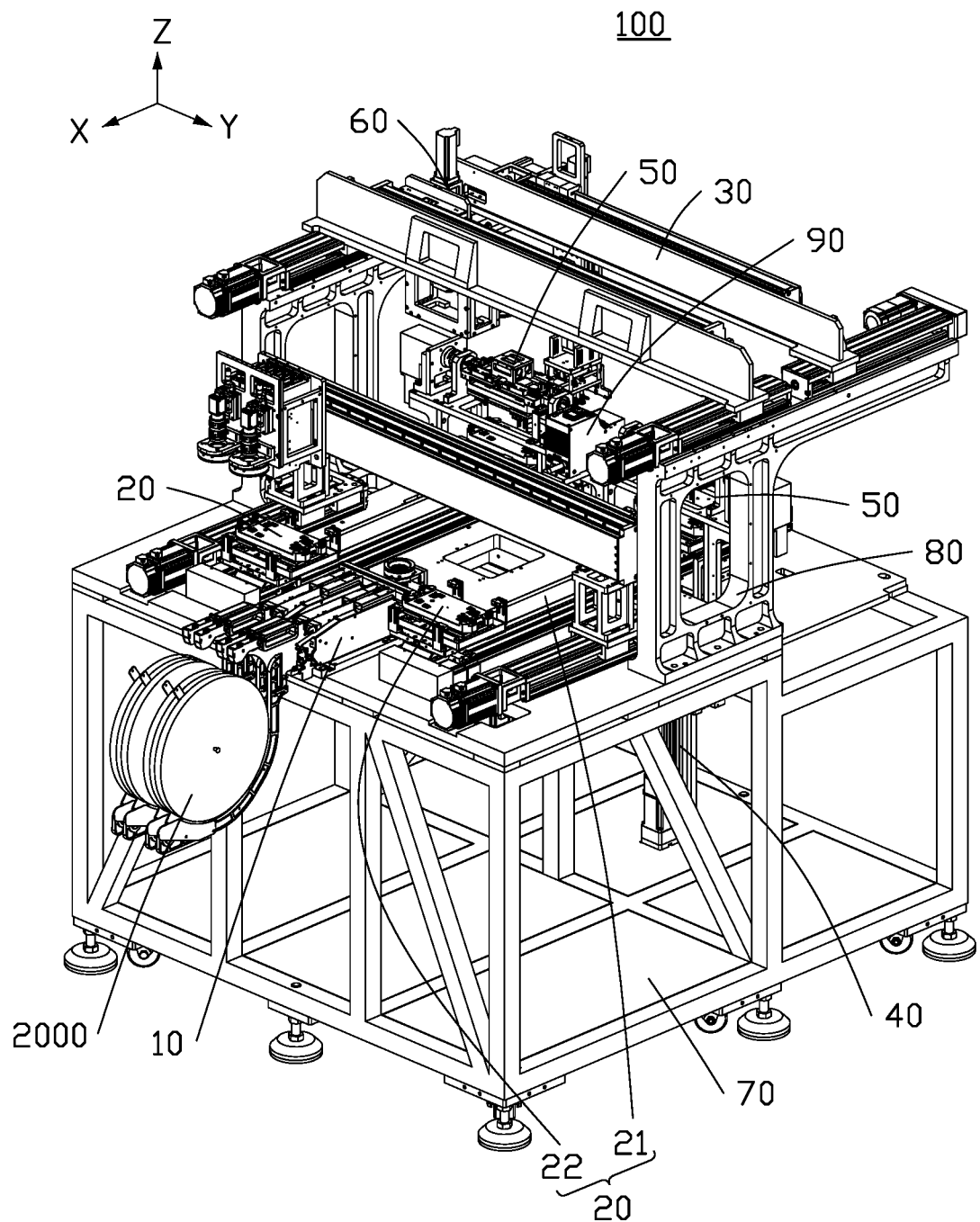
FIG. 1 is a perspective view of an automatic locking device according to an embodiment of the present disclosure.

It will be appreciated that for simplicity and clarity of illustration, where appropriate, reference numerals have been repeated among the different figures to indicate corresponding or analogous components. The description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 2:
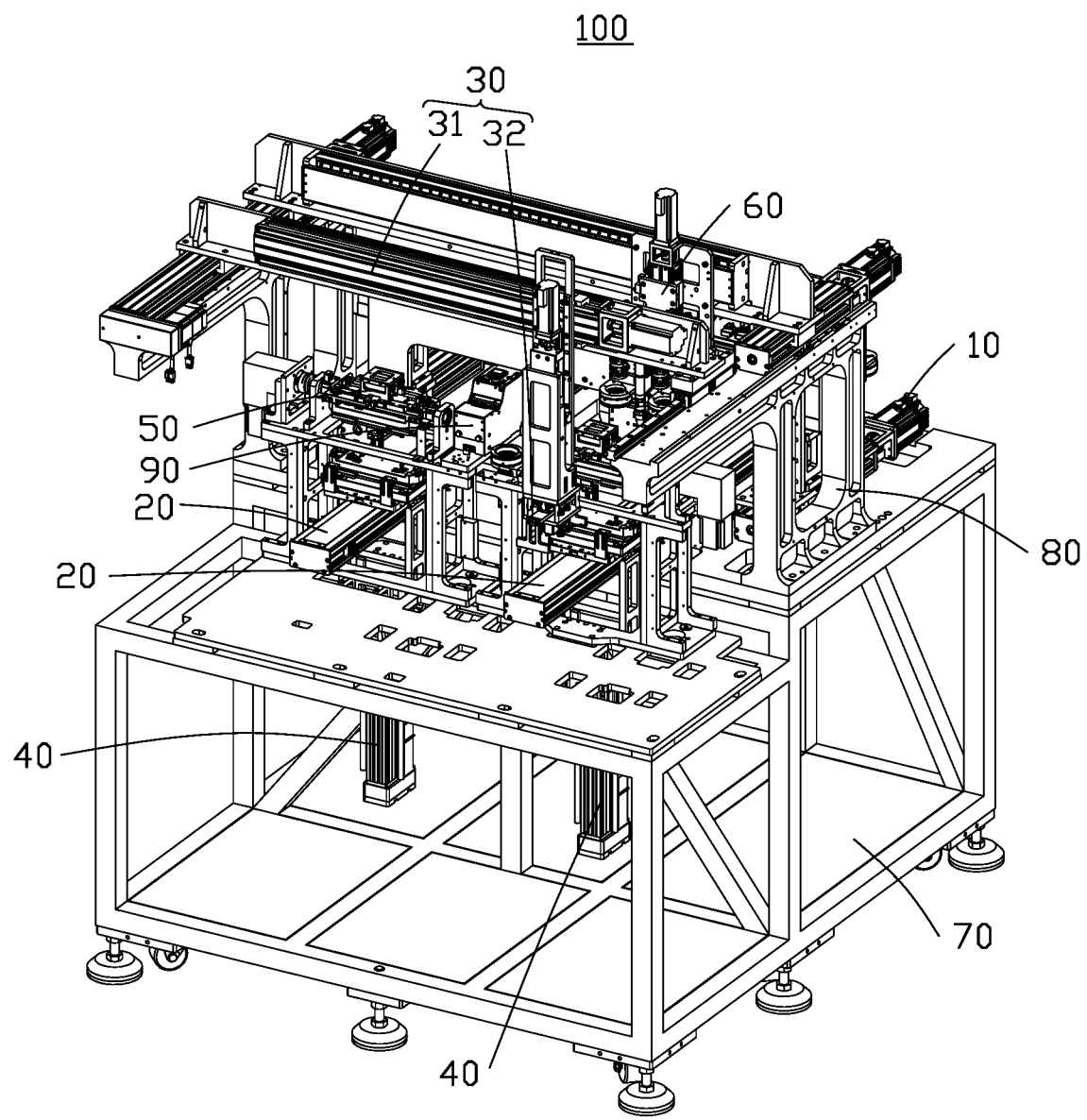
FIG. 2 is another perspective view of the automatic locking device of FIG. 1.
Figure 3A:
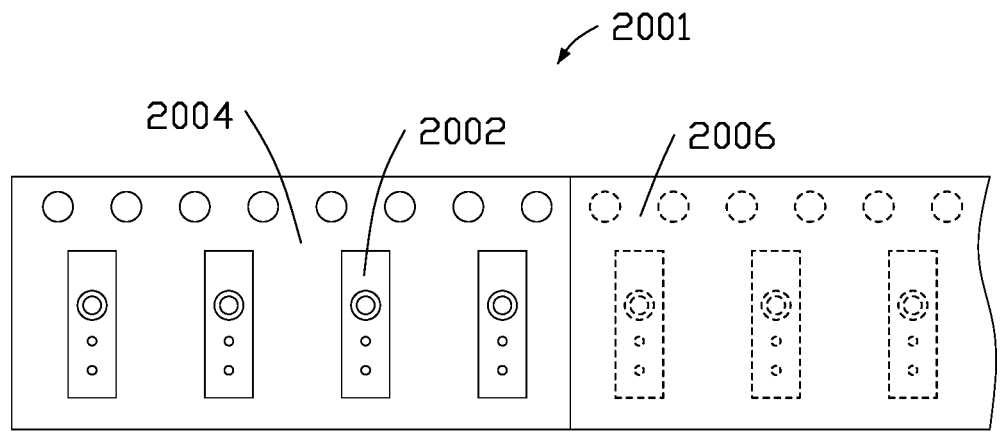
FIG. 3A is a perspective view of a material belt according to an embodiment of the present disclosure.
Figure 3B:
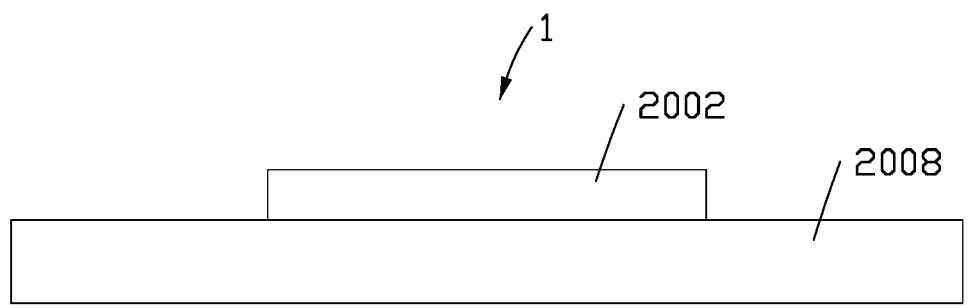
FIG. 3B is a perspective view of an assembled product according to an embodiment of the present disclosure.

Referring to FIGS. 1 and 2, an automatic locking device 100 is provided according to an embodiment of the present disclosure. The automatic locking device 100 is used to lock and assemble at least one part 2002 to a workpiece 2008, as shown in FIGS. 3A and 3B, to obtain an assembled product 1. In at least one embodiment, the part 2002 may be a bracket, and the workpiece 2008 may be a display panel or a backplane. The automatic locking device 100 includes a feeding mechanism 10, at least one fixture mechanism 20, a loading and unloading mechanism 30, at least one lifting mechanism 40, at least one rotating mechanism 50, and a locking mechanism 60. In the exemplary embodiment, the automatic locking device 100 includes two fixture mechanism 20, two lifting mechanisms 40, and two rotating mechanisms 50. The feeding mechanism 10, the two fixture mechanisms 20, the loading and unloading mechanism 30, the two lifting mechanisms 40, the two rotating mechanisms 50, and the locking mechanism 60 may be arranged on a platform 70. The two fixture mechanisms 20 are spaced from each other. Each of the two lifting mechanisms 40 and each of the two rotating mechanisms 50 correspond to one fixture mechanism 20.

The feeding mechanism 10 is used to feed the part 2002 to the fixture mechanism 20. The fixture mechanism 20 includes a sliding assembly 21 and a fixture assembly 22 mounted on the sliding assembly 21. The fixture assembly 22 is adjacent to the feeding mechanism 10, and is used to hold the part 2002 from the feeding mechanism 10. The loading and unloading mechanism 30 is adjacent to the fixture mechanism 20, and is used to feed the workpiece 2008 onto the part 2002 held on the fixture assembly 22. The lifting mechanism 40 is adjacent to the fixture mechanism 20. The sliding assembly 21 is used to drive the fixture assembly 22 to slide to be above the lifting mechanism 40, such that the lifting mechanism 40 can lift up the fixture assembly 22 together with the part 2002 and the workpiece 2008 placed on the part 2002. The rotating mechanism 50 is arranged above the lifting mechanism 40, and is used to rotate the fixture assembly 22 together with the part 2002 and the workpiece 2008 placed on the part 2002. After the rotation, the part 2002 is located on the workpiece 2008. The locking mechanism 60 is arranged above the rotating mechanism 50, and is used to lock and assemble the part 2002 onto the fixture assembly 22. Then, the process of assembling the part 2002 to the workpiece 2008 is completed, the sliding assembly 21 moves the fixture assembly 22 to be below the loading and unloading mechanism 30, and the loading and unloading mechanism 30 is further used to unload the assembled product 1. In at least one embodiment, the sliding assembly 21 may be a linear module such as a linear motor.

The automatic locking device 100 integrates multiple functions by setting the feeding mechanism 10, the fixture mechanism 20, the loading and unloading mechanism 30, the lifting mechanism 40, the rotating mechanism 50, and the locking mechanism 60 on the platform 70. Thus, the automatic locking device 100 provided by the present disclosure realizes multiple functions of loading, lifting, rotating, locking, and unloading in a single work station, which reduces the number of the work stations and operatives, lowers the cost, and improves accuracy of the assembly. Furthermore, since the different mechanisms are integrated into the automatic locking device 100, the size of the automatic locking device 100 is reduced, such that more automatic locking devices 100 may be included in a same space to improve the assembly efficiency.

In addition, the part 2002 is positioned on the fixture assembly 22. The workpiece 2008 is then placed on the part 2002 positioned on the fixture assembly 22, thereby preventing the workpiece 2008 from affecting the positioning of the part 2002.

Referring to FIG. 3A, multiple parts 2002 are spaced from each other on a bottom belt 2004, and a protective film 2006 covers the parts 2002 to form a material belt 2001. The protective film 2006 protects the parts 2002. The material belt 2001 can be wound to form a material roll 2000 shown in FIG. 1.

Figure 4:
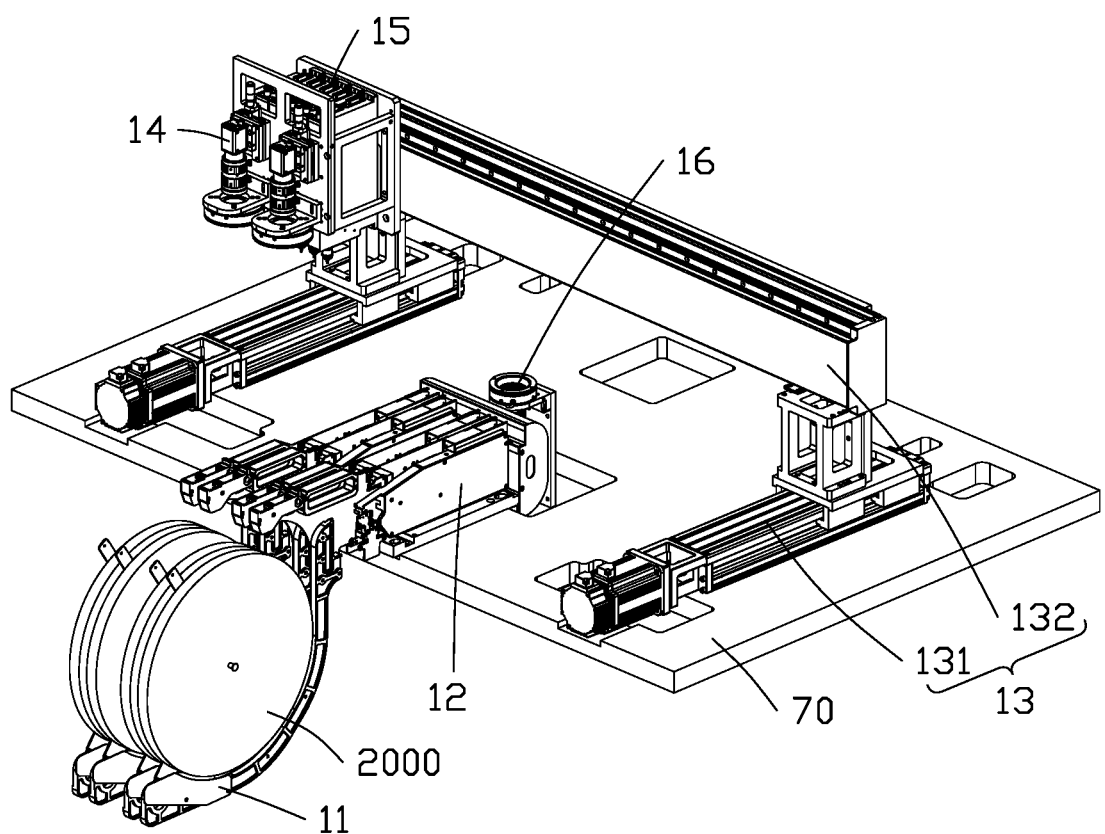
FIG. 4 is a perspective view of a feeding mechanism of the automatic locking device of FIG. 1.

Referring to FIG. 4, the feeding mechanism 10 includes a holder 11, a film removing assembly 12, a transfer assembly 13, a visual assembly 14, an adjusting assembly 15, and a correction assembly 16. The holder 11 is used to hold the material roll 2000 formed by winding the material belt 2001 and feeds the material belt 2001 to the film removing assembly 12. The film removing assembly 12 is adjacent to the holder 11, and is used to remove the protective film 2006 of the material belt 2001 to expose the parts 2002. Each of the visual assembly 14 and the adjusting assembly 15 is arranged on the transfer assembly 13. The transfer assembly 13 is used to move the visual assembly 14 and the adjusting assembly 15 to be above the film removing assembly 12. The visual assembly 14 can detect a position of the part 2002 on the film removing assembly 12. The adjusting assembly 15 is used to suck the part 2002 according to the detected position of the part 2002. Since the part 2002 may be deviated from its original position on the bottom belt 2004 or titled relative to the bottom belt 2004 after the protective film 2006 is removed, the detected position of the part 2002 may allow the adjusting assembly 15 to precisely suck the part 2002. The transfer assembly 13 is further used to move the visual assembly 14 and the adjusting assembly 15 to be above the correction assembly 16. The correction assembly 16 is used to detect a position of the part 2002 sucked by the adjusting assembly 15. The part 2002 may be deviated from its original position on the adjusting assembly 15 or titled relative to the adjusting assembly 15, and the adjusting assembly 15 can further adjust the position of the part 2002 thereon according to the detected position of the part 2002. The transfer assembly 13 is further used to move the visual assembly 14 and the adjusting assembly 15 to be above the fixture assembly 22. The visual assembly 14 is further used to detect a position of the fixture assembly 22, and the adjusting assembly 15 is further used to adjust the position of the part 2002 according to the detected position of the fixture assembly 22. Then, the adjusting assembly 15 is further used to place the part 2002 on the fixture assembly 22. Since the fixture assembly 22 may be deviated from its original position on the sliding assembly 21 or titled relative to the sliding assembly 21 when the lifting mechanism 40 returns the fixture assembly 22 back to the sliding assembly 21, the detected position of the fixture assembly 22 allows the adjusting assembly 15 to precisely adjust the position of the part 2002 and precisely place the part 2002 on the fixture assembly 22. Therefore, unqualified assembling of the part 2002 and the workpiece 2008 may be avoided. In at least one embodiment, the film removing assembly 12, the transfer assembly 13, and the correction assembly 16 are arranged on the platform 70. The holder 11 and the film removing assembly 12 are connected to each other to form a feeder mechanism.

Figure 5:
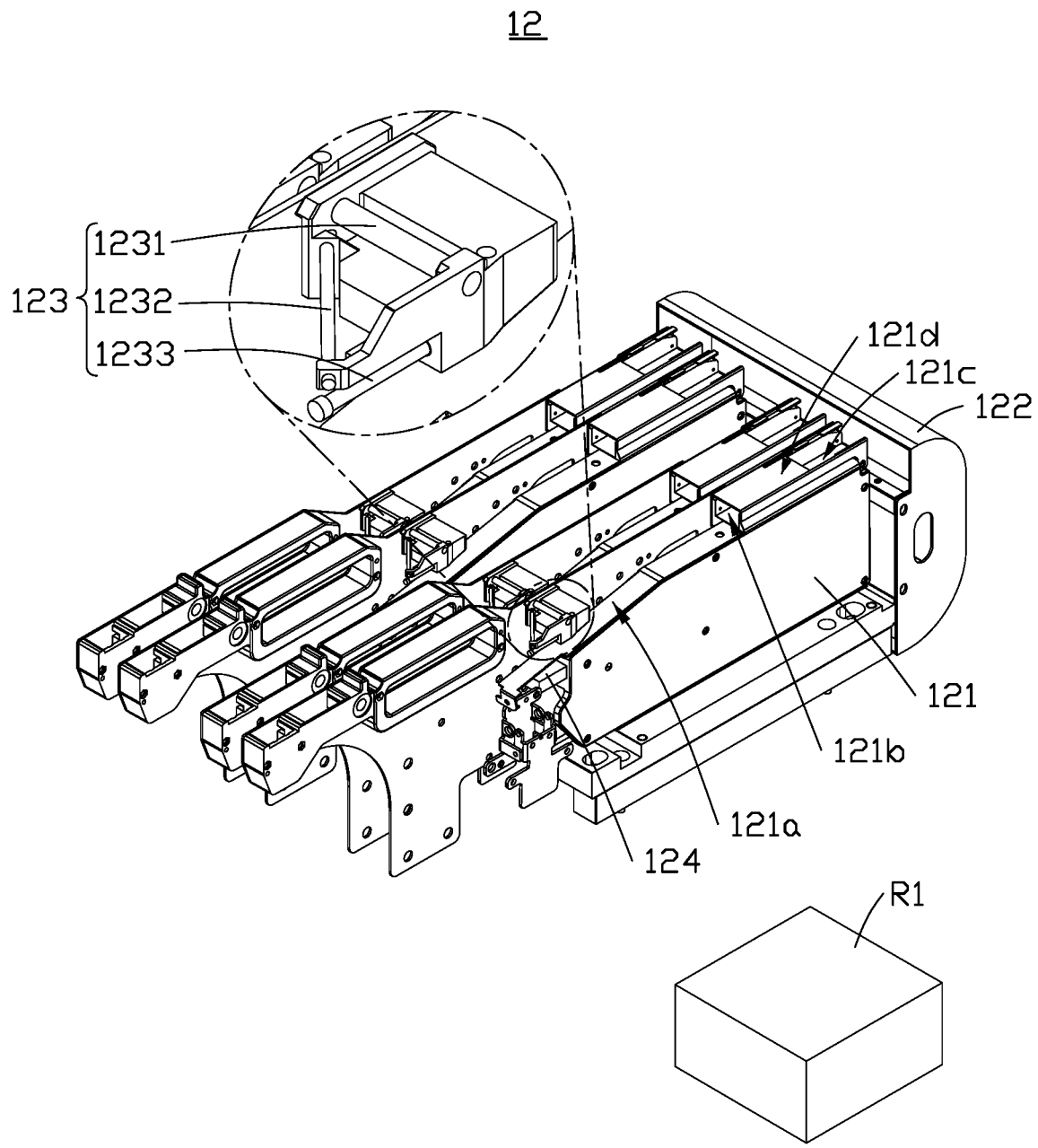
FIG. 5 is an explosive view of a film removing assembly of the feeding mechanism of FIG. 4.

Referring to FIG. 5, the film removing assembly 12 includes a support plate 121 and a guiding member 122. Each of the support plate 121 and the guiding member 122 is arranged on the platform 70. The support plate 121 is located between the holder 11 and the guiding member 122. A support surface 121a, a motion cavity 121b, and a receiving groove 121c are successively arranged on the support plate 121. The material belt 2001 from the material roll 2000 on the holder 11 is supported by the support surface 121a and extends through the motion cavity 121b. After the material belt 2001 extends through the motion cavity 121b, the protective film 2006 will be bent backward and pass through a ceiling 121d of the motion cavity 121b. Thus, the parts 2022 are exposed on the bottom belt 2004, and are supported in the receiving groove 121c. The moving direction of the protective film 2006 may be opposite to the moving direction of the bottom belt 2004. The bent protective film 2006 is located above the bottom belt 2004. Then, the adjusting assembly 15 can suck the parts 2002, and the guiding member 122 further guides the bottom belt 2004 without the parts 2002 forward to a recycle container R1.

The protective film 2006 extending through the ceiling 121d can move downward to another recycle container R2, and the recycle container R2 may be positioned below the support plate 121. In at least one embodiment, the film removing assembly 12 further includes a deflection module 123 and a deflection driver 124. The deflection module 123 is mounted to the support plate 121 and located above the support surface 121a. The deflection module 123 is used to change the moving direction the protective film 2006 that extending through the ceiling 121d, thereby preventing the protective film 2006 from interacting with the material belt 2001 on the support surface 121a. The deflection driver 124 is arranged on the support plate 121 and located below the support surface 121a. The deflection driver 124 is connected to an end of the protective film 2006, and is used to move (e.g., by pulling) the protective film 2006 to the recycle container R2. By pulling the protective film 2006, the deflection driver 124 may also provide power for separating the protective film 2006 from the bottom belt 2004. The bottom belt 2004 that extending through the receiving groove 121c is limited by two opposite walls of the receiving groove 121c, thereby avoiding the deviation of the bottom belt 2004 and allowing the adjusting assembly 15 to precisely suck the part 2002 on the bottom belt 2004. In addition, the ceiling 121d of the motion cavity 121b can prevent the bottom belt 2004 from being titled when the part 2002 is sucked by the adjusting assembly 15.

The deflection module 123 includes a first roller 1231, a second roller 1232, and a third roller 1233. Each of the first roller 1231, the second roller 1232, and the third roller 1233 is rotatably mounted on the support plate 121. The first roller 1231 is located directly above the support surface 121a, and can rotate about an axis perpendicular to the moving direction of the bent protective film 2006. The first roller 1231 is used to guide the bent protective film 2006 to the second roller 1232. The second roller 1232 is located directly above the support surface 121a, and an axis of the second roller 1232 is inclined with an axis of the first roller 1231 such that the second roller 1232 can change the moving direction of the protective film 2006. The third roller 1233 is located obliquely above the support surface 121a, and an axis of the third roller 1233 is parallel to the moving direction of the material belt 2001 such that the moving direction of the protective film 2006 is changed again by the third roller 1233. After the protective film 2006 passes through the third roller 1233, the protective film 2006 bypasses the material belt 2001 in a moving direction perpendicular to the moving direction of the material belt 2001, thereby preventing the protective film 2006 from interfering with the material belt 2001. In other embodiments, the deflection module 123 may include more or fewer rollers cooperatively for changing the moving direction of the protective film 2006.

An angle between the second roller 1232 and the first roller 1231 is 45°, and an angle between the second roller 1232 and the third roller 1233 is also 45°. Therefore, the moving direction of the protective film 2006 may be changed smoothly. In other embodiments, the angle between the second roller 1232 and the first roller 1231 may be 10°, 15°, 30°, 60°, 75°, or 80°.

Referring to FIG. 4, a side of the guiding member 122 away from the support plate 121 is arc-shaped, which may guide the bottom belt 2004 to the recycle container R1. The recycle container R1 may be below the platform 70.

Referring to FIG. 4, four feeder mechanisms are arranged at intervals, and each feeder mechanism includes the holder 11 and the film removing assembly 12. The four feeder mechanisms can provide multiple parts 2002 simultaneously. In other embodiments, the number of the feeder mechanism(s) may also be one, two, three, five, or more.

Figure 6:
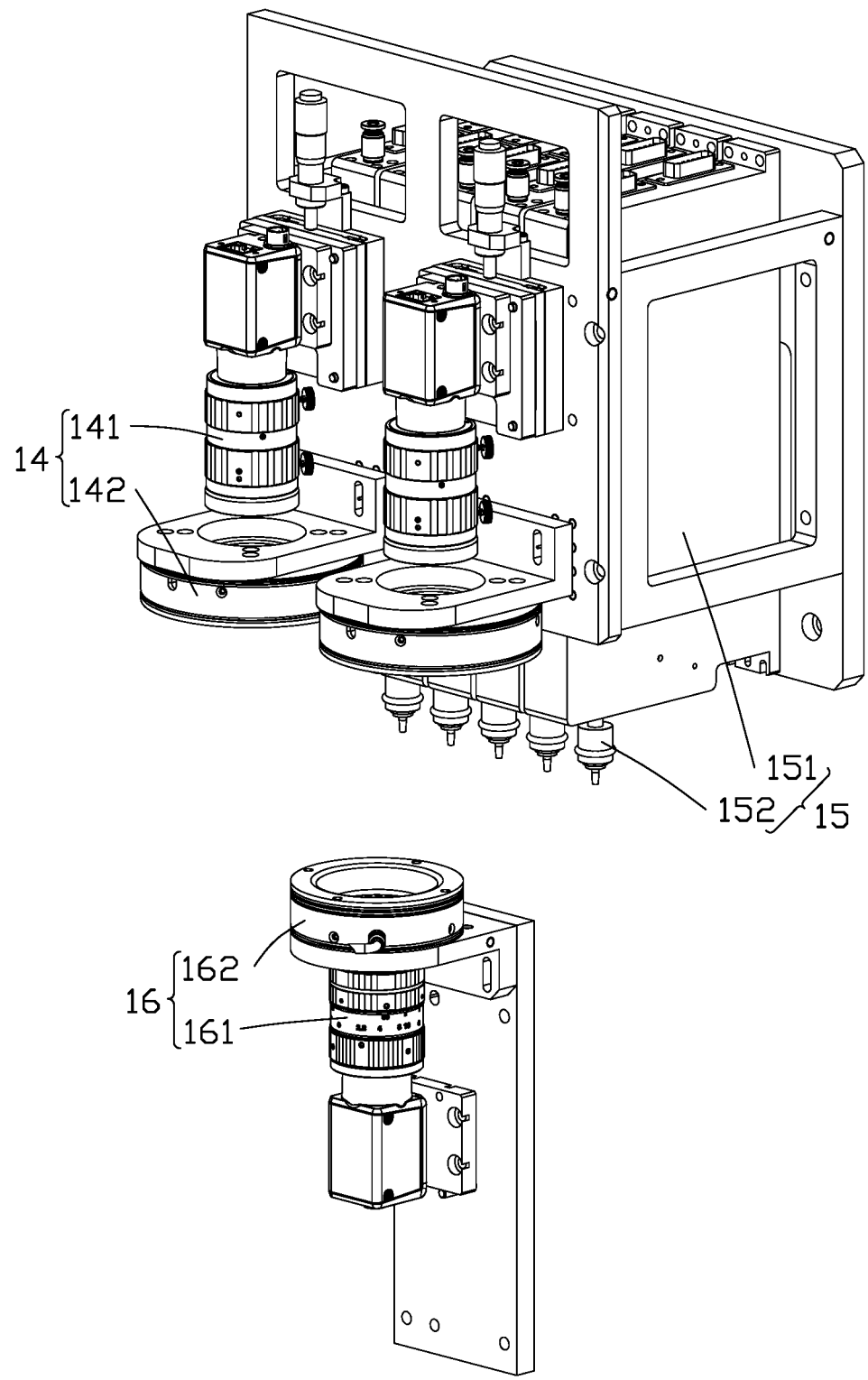
FIG. 6 is a perspective view of a visual assembly, an adjusting assembly, and a correction assembly of the feeding mechanism in FIG. 4.

Referring to FIG. 6, the adjusting assembly 15 includes an adjusting driver 151 and a suction nozzle 152. The adjusting driver 151 is arranged on the transfer assembly 13. The suction nozzle 152 is connected to the adjusting driver 151 and used to suck the part 2002. The adjusting driver 151 is used to drive the suction nozzle 152 to move along a first direction and rotate around an axis parallel to the first direction. The suction nozzle 152 is used to suck the part 2002. Therefore, the adjusting driver 151 can move the suction nozzle 152 to suck and release the part 2002, and can adjust the position of the suction nozzle 152 such that the suction nozzle 152 may precisely suck the part 2002. In at least one embodiment, the first direction is Z-axis direction shown in FIG. 1, a second direction is X-axis direction shown in FIG. 1, and a third direction is Y-axis direction shown in FIG. 1. The first direction, the second direction, and the third direction are perpendicular to each other.

Referring to FIG. 4, the transfer assembly 13 includes two first sliding units 131 arranged on the platform 70 and a second sliding unit 132 supported on the two first sliding units 131. The two first sliding units 131 are arranged on two opposite sides of the film removing assembly 12, and two ends of the second sliding unit 132 are connected to the two first sliding units 131, respectively. The visual assembly 14 and the adjusting driver 151 of the adjusting assembly 15 are arranged on the second sliding unit 132. The first sliding units 131 are used to drive the visual assembly 14 and the adjusting assembly 15 to move along the second direction, and the second sliding unit 132 is used to drive the visual assembly 14 and the adjusting assembly 15 to move along the third direction. The two first sliding units 131 provide balance during the movements of the second sliding unit 132, the adjusting assembly 15, and the visual assembly 14, thereby allowing the adjusting assembly 15 to suck and release the parts 2002 precisely. In at least one embodiment, each of the first sliding units 131 and the second sliding unit 132 is a linear module. The film removing assembly 12 is located substantially in the middle position between the two first sliding units 131.

In other embodiments, one of the two first sliding units 131 may be replaced by a guiding rail.

Referring to FIG. 6, the visual assembly 14 includes at least one image-capturing unit 141 and at least one light source 142. The at least one image-capturing unit 141 and the at least one light source 142 are coaxially arranged. Each image-capturing unit 141 and each light source 142 are arranged on the second sliding unit 132. Each image-capturing unit 141 is used to capture images of the part 2002, and each light source 142 is used to illuminate the part 2002 such that the quality of the images may be improved. In at least one embodiment, the visual assembly 14 may include two image-capturing units 141 and two light sources 142, and each of the two image-capturing units 141 corresponds to one of the two light sources 142. Each image-capturing unit 141 may be a camera.

Referring to FIG. 6, the correction assembly 16 includes an image-capturing unit 161 and a light source 162. The image-capturing unit 161 is arranged on the platform 70 and located substantially in the middle position between the two first sliding units 131. The image-capturing unit 161 is used to capture images of the part 2002, and the light source 162 is used to illuminate the part 2002 such that the quality of the images may be improved. The image-capturing unit 161 may be a camera.

Referring to FIG. 2, the loading and unloading mechanism 30 includes a 3-axis moving module 31 and a loading and unloading head 32. The 3-axis moving module 31 is mounted on the platform 70 through a supporting rack 80. The loading and unloading head 32 is connected to the 3-axis moving module 31. The 3-axis moving module 31 is used to move the loading and unloading head 32 along the first direction, the second direction, and the third direction, thereby allowing the loading and unloading head 32 to place the part 2002 onto the fixture assembly 22 or to unload the assembled product 1 from the fixture assembly 22. In at least one embodiment, the 3-axis moving module 31 may be a 3-axis linear module or a robot arm. The loading and unloading head 32 may be a robot hand or a nozzle.

Figure 7:
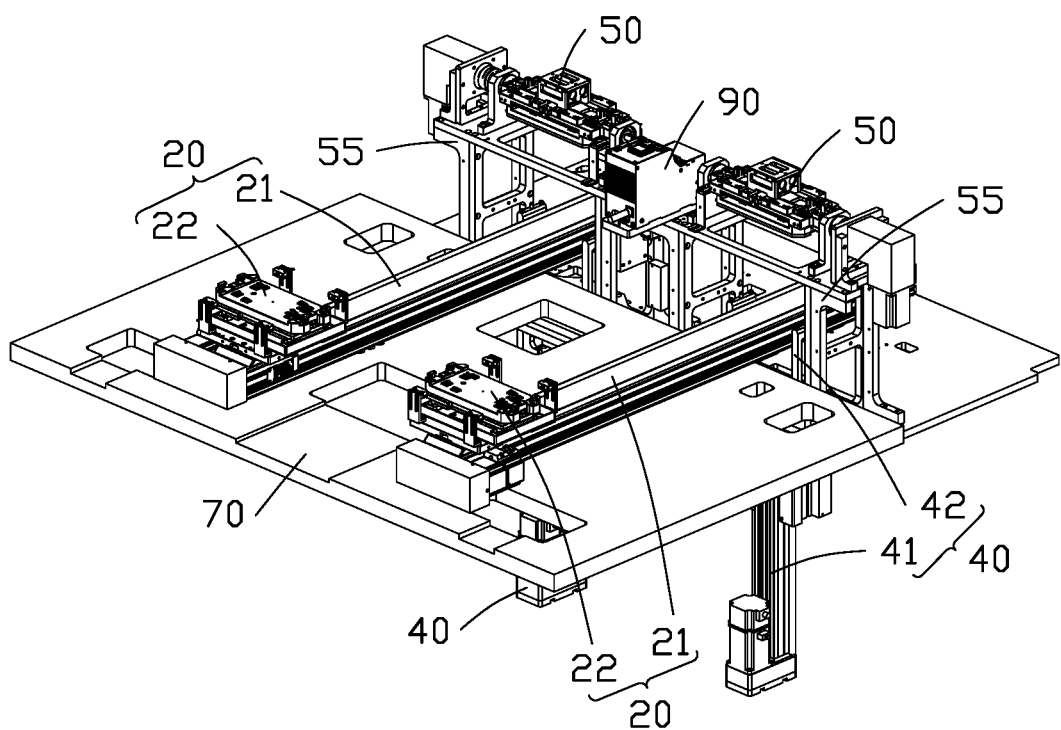
FIG. 7 is a perspective view of a fixture mechanism, a lifting mechanism, and a rotating mechanism of the automatic locking device of FIG. 1.
Figure 8:
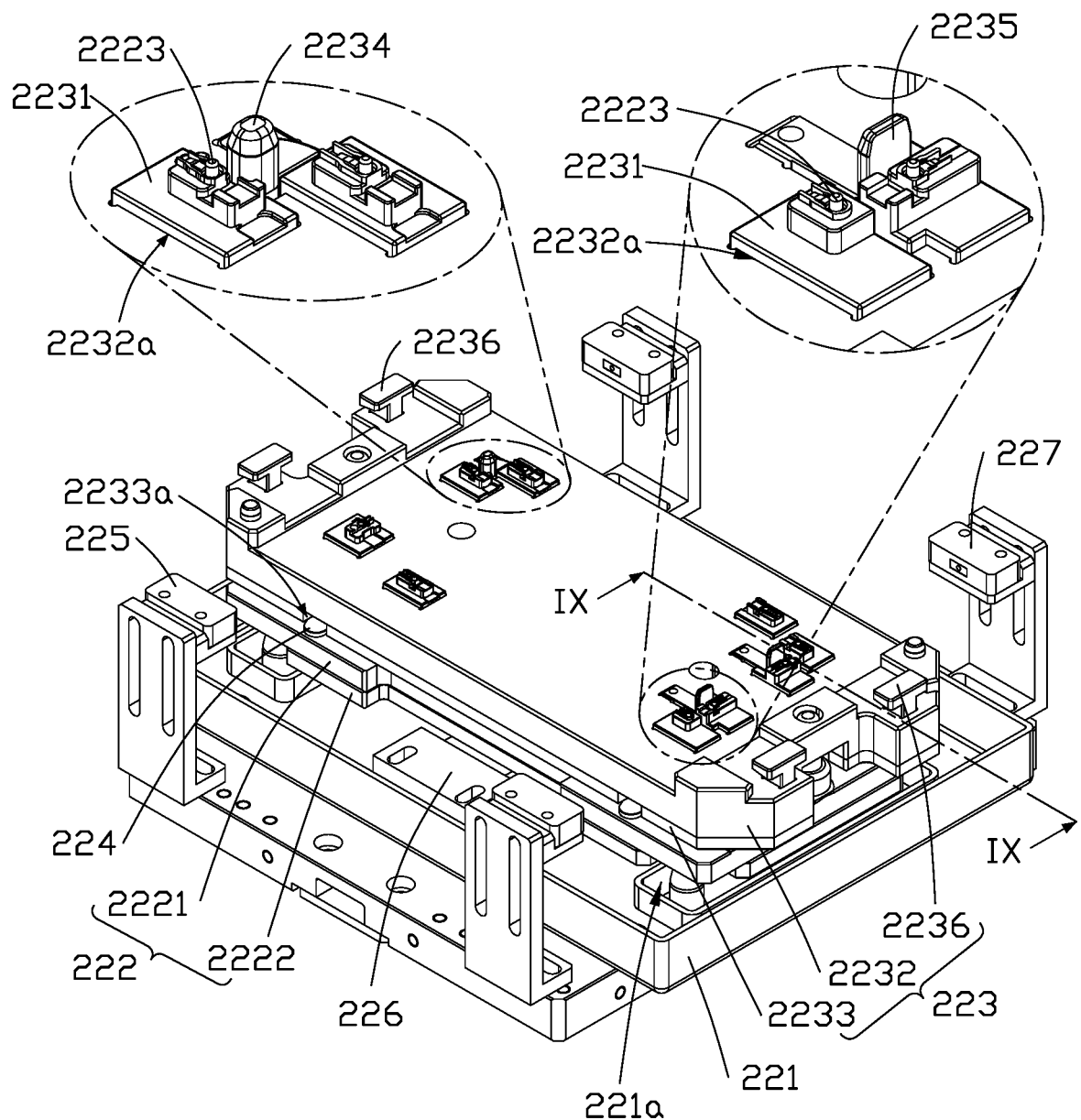
FIG. 8 is another perspective view of the fixture mechanism of FIG. 7.

Referring to FIGS. 7 and 8, the fixture assembly 22 includes a base 221, a supporter 222, and a carrier 223. The base 221 is arranged on the sliding assembly 21. The supporter 222 is detachably disposed on the base 221. The carrier 223 is detachably disposed on the supporter 222. The carrier 223 is provided with one or more profiling blocks 2231 thereon, and each profiling block 2231 is used to hold and position one part 2002. The workpiece 2008 is placed on the carrier 223 and covers the part 2002. The lifting mechanism 40 includes a lifting driver 41 and at least one lifting rod 42 connected to the lifting driver 41. The lifting driver 41 is arranged below the sliding assembly 21, and the lifting rod 42 is located on one side of the sliding assembly 21. The base 221 defines an avoidance hole 221a, and the lifting rod 42 driven by the lifting driver 41 can move through the avoidance hole 221a and abut against the supporter 222. Thus, the lifting rod 42 can lift up the supporter 222 and the carrier 223, while the base 221 remains at its original position. Thus, the load of the lifting mechanism 40 is reduced. Since the carrier 223 is detachably disposed on the supporter 222, the rotating mechanism 50 only rotates the carrier 223, thus reducing the load of the rotating mechanism 50. Furthermore, the locking mechanism 60 only needs to pass through the carrier 223 to lock the part 2002 to workpiece 2008, which may reduce a length of the locking mechanism 60.

The lifting driver 41 can be a linear cylinder, and the lifting mechanism 40 includes two lifting rods 42. The two lifting rods 42 are arranged at intervals and connected to the lifting driver 41 via a connecting board (not shown). The connecting board is located below the sliding assembly 21 or the platform 70. The two lifting rods 42 are located on two opposite sides of the sliding assembly 21. The two lifting rods 42 may keep the supporter 222 and the carrier 223 in balance when lifting up the supporter 222 and the carrier 223.

Figure 9:
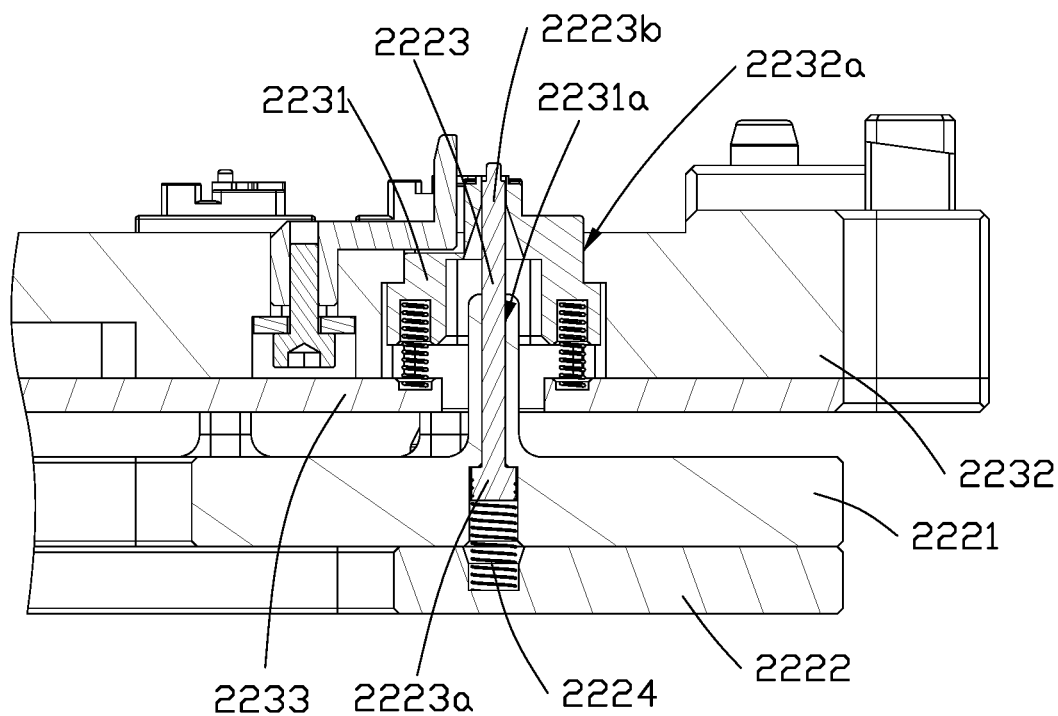
FIG. 9 is a cross-sectional view along IX-IX of FIG. 8.

Referring to FIGS. 8 and 9, the carrier 223 includes a bearing plate 2232 and a movable plate 2233. The bearing plate 2232 is movably connected to the movable plate 2233. The bearing plate 2232 faces the rotating mechanism 50. The bearing plate 2232 defines one or more receiving holes 2232a for receiving the one or more profiling blocks 2231, and each profiling block 2231 is fixed in the corresponding receiving hole 2232a and elastically connected to the movable plate 2233 such as by a spring, a rubber member, or any other elastic object, such that the bearing plate 2232 is movably connected to the movable plate 2233. Referring to FIG. 9, the profiling block 2231 has a stepped shape, and the receiving hole 2232a in the bearing plate 2232 also has a stepped shape, thereby preventing the profiling block 2231 from separating from the bearing plate 2232 under the elastic force from the elastic object. The profiling block 2231 defines a screw hole 2231a allowing the locking mechanism 60 to pass through. The supporter 222 includes a guiding plate 2221, a mounting plate 2222, a movable pin 2223, and an elastic member 2224. The guiding plate 2221 is connected to the mounting plate 2222, and is located between the mounting plate 2222 and the movable plate 2233. A first end 2223a of the movable pin 2223 is resisted against the mounting plate 2222 by the elastic member 2224. A second end 2223b of the movable pin 2223 opposite to the first end 2223a can movably extend through the screw hole 2231a in the guiding plate 2221, the movable plate 2233, the bearing plate 2232, and the profiling block 2231, and protrudes from the profiling block 2231. The second end 2223b of the movable pin 2223 is used to position the part 2002 and the workpiece 2008. The rotating mechanism 50 can press the movable pin 2223, causing the movable pin 2223 to compress the elastic member 2224, thereby the rotating mechanism 50 can firmly hold the workpiece 2008 and the part 2002 on the bearing plate 2232. In addition, after the supporter 222 is separated from the bearing plate 2232, the movable pin 2223 moves together with the supporter 222 and separates from the carrier 223, thereby exposing the screw hole 2231a and allowing the locking mechanism 60 to insert into the screw hole 2231a. After the part 2002 has been locked to the workpiece 2008 by the locking mechanism 60, the carrier 223 is connected to the supporter 222 again, the movable pin 2223 passes through the screw hole 2231a and presses against the assembled product 1, and the assembled product 1 in turn presses the movable pin 2223 to compress the elastic member 2224, thereby preventing the assembled product 1 from being pushed away from the bearing plate 2232.

In order to precisely position the workpiece 2008 on the carrier 223 and prevent the assembled product 1 from being pushed away from the bearing plate 2232, the bearing plate 2232 of the carrier 223 is provided with a number of first positioning members 2234 and a number of second positioning members 2235. The first positioning members 2234 are used to position the workpiece 2008 in the first direction. The second positioning members 2235 are used to position the workpiece 2008 in the second direction and the third direction. The second positioning members 2235 may clamp the workpiece 2008 on the bearing plate 2232.

A plurality of guiding slots 2233a are defined on a surface of the movable plate 2233 facing the guiding plate 2221. A plurality of guiding bars 224 are arranged on a surface of the guiding plate 2221 facing the movable plate 2233. The guiding bars 224 are used to receive the guiding slots 2233a, thereby allowing the carrier 223 to be precisely placed on the supporter 222 again after the carrier 223 is separated from the supporter 222. The supporter 222 and the base 221 may also be provided with guiding slots and guiding bars to allow the supporter 222 to be precisely placed on the base 221 again.

Figure 10:
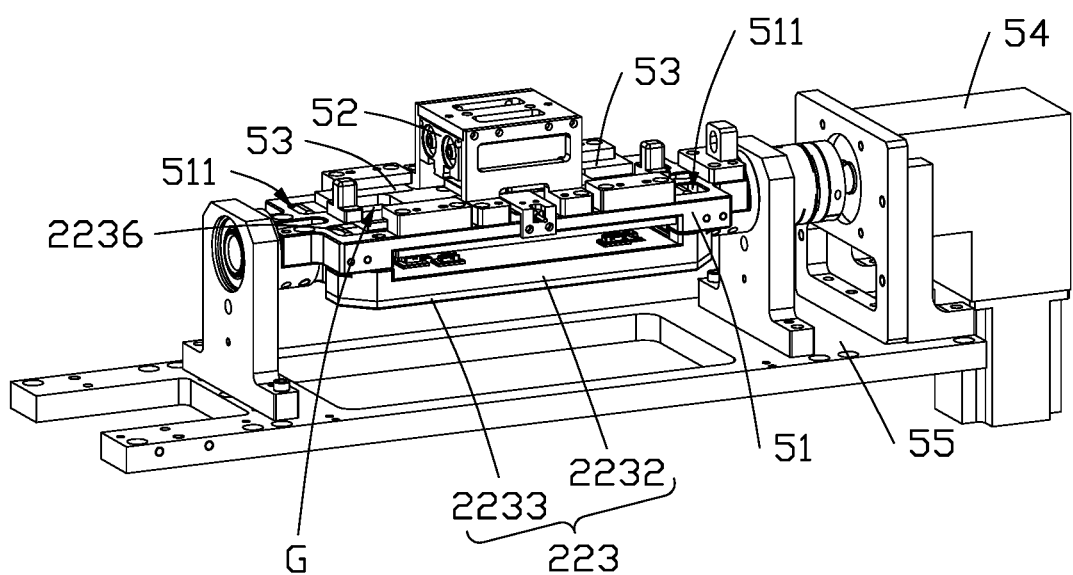
FIG. 10 is a perspective view showing a carrier of the fixture assembly fixed to the rotating mechanism.

Referring to FIGS. 8 and 10, in order to allow the rotating mechanism 50 to hold the carrier 223, the carrier 223 is provided with at least one protrusion 2236. The rotating mechanism 50 includes a cover plate 51, a latch driver 52, at least one latch 53, and a rotating driver 54. The cover plate 51 is located above the lifting mechanism 40. At least one avoidance hole 511 is defined in the cover plate 51, and each protrusion 2236 extends through one corresponding avoidance hole 511 when the cover plate 51 covers the carrier 223. The latch driver 52 and each latch 53 are located on a surface of the cover plate 51 away from the lifting mechanism 40. The latch 53 is connected to the latch driver 52, and is driven by the latch driver 52 to extend through the avoidance hole 511 and then cooperate with the protrusion 2236, so that the carrier 223 is fixed to the cover plate 51. When the bearing plate 2232 approaches the cover plate 51, the cover plate 51 presses the movable pin 2223 downward to compress the elastic member 2224 until the cover plate 51 presses against the workpiece 2008, so that the workpiece 2008 and the part 2002 are fixed on the bearing plate 2232. The rotating driver 54 is mounted on the platform 70 by a pair of frames 55 and arranged above the lifting mechanism 40. The rotating driver 54 is connected to the cover plate 51, and is used to rotate the cover plate 51, the latch driver 52, the latch 53, and the carrier 223 such as by 180 degrees for example. In at least one embodiment, before the rotating driver 54 rotates the cover plate 51 and the carrier 223, the lifting driver 41 drives the lifting rod 42 to lift up the supporter 222 to separate the supporter 222 from the carrier 223, thereby preventing the rotating cover plate 51/carrier 223 from interfering with the supporter 222. After the part 2002 is locked to the workpiece 2008, the rotating driver 54 rotates the cover plate 51 and the carrier 223 again, and the lifting driver 41 drives the lifting rod 42 to move the supporter 222 toward the carrier 223 until the supporter 222 is in contact with the carrier 223. The latch driver 52 drives the latch 53 to separate from the corresponding protrusion 2236, thereby releasing the carrier 223 from the cover plate 51. Then, the lifting driver 41 drives the lifting rod 42 to move each of the supporter 222 and the carrier 223 away from the cover plate 51 until the supporter 222 and the carrier 223 are placed on the base 221. Then, the lifting driver 41 drives the lifting rod 42 to move to be below the base 221.

One end of the protrusion 2236 away from the rotating mechanism 50 extends through and protrudes from the bearing plate 2232. The end of the protrusion 2236 is connected to the movable plate 2233. In other embodiments, the end of the protrusion 2236 away from the rotating mechanism 50 may extend through the bearing plate 2232, and further extend through and protrude from the movable plate 2233. The end of the protrusion 2236 may be connected to the movable plate 2233 by a screw.

The carrier 223 is provided with four protrusions 2236, and the rotating mechanism 50 includes two latches 53. Each latch 53 cooperates with two protrusions 2236. The latch driver 52 is a linear cylinder with two outputs, and each of the two outputs is connected to one latch 53. In the embodiment, the protrusion 2236 has a T-shaped cross section. When the protrusion 2236 is inserted into the avoidance hole 511, a gap G is defined between the protrusion 2236 and a surface of the cover plate 51 away from the lifting mechanism 40. The latch 53 can be inserted into the gap G to fix the cover plate 51 to the carrier 223, and can also exit the gap G to separate the carrier 223 from the cover plate 51. In other embodiments, the protrusion 2236 may define a slot. One end of the latch 53 may be inserted into the slot of the protrusion 2236, thereby fixing the cover plate 51 to the carrier 223.

Referring to FIG. 8, the fixture mechanism 20 further includes a base sensor 226, a carrier sensor 227, and a workpiece sensor 225. The base sensor 226, the carrier sensor 227 and the workpiece sensor 225 are spaced from each other on the base 221. The base sensor 226 is used to sense whether the supporter 222 is placed on the base 221. The carrier sensor 227 is used to sense whether the carrier 223 is placed on the supporter 222. The workpiece sensor 225 is used to sense whether the workpiece 2008 is placed on the carrier 223. The base sensor 226, the carrier sensor 227, and the workpiece sensor 225 may be distance sensors or infrared sensors.

Figure 11:
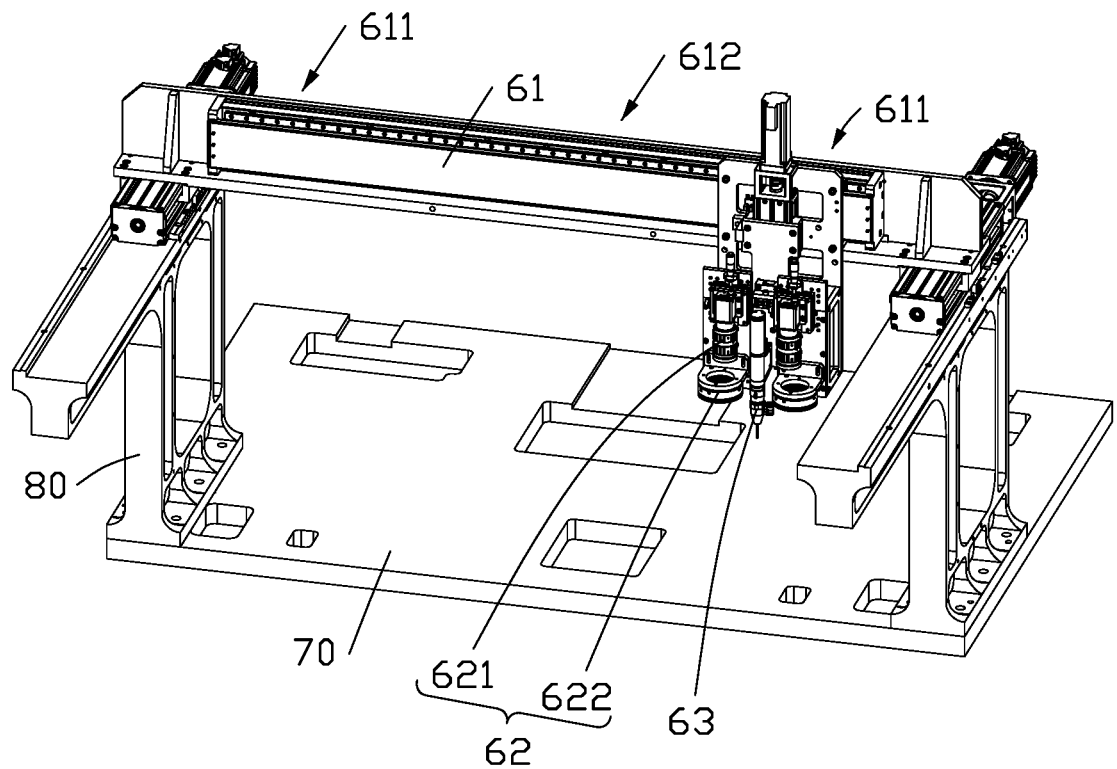
FIG. 11 is a perspective view of a locking mechanism of the automatic locking device of FIG. 2.

Referring to FIG. 11, the locking mechanism 60 includes a motion assembly 61, a detection assembly 62, and a locking assembly 63. The motion assembly 61 is used to move between a screwing station 611 and a screw feeding station 612. The detection assembly 62 is arranged on the motion assembly 61, and is used to detect the position of the screw at the screw feeding station 612 and the position of the part 2002 on the fixture assembly 22 rotated by the rotating mechanism 50. The locking assembly 63 is arranged on the motion assembly 61 and adjacent to the detection assembly 62. The locking assembly 63 is used to cooperate with the detection assembly 62 to suck the screw at the screw feeding station 612 and to secure the part 2002 to the workpiece 2008 by the sucked screw. The screwing station 611 may be a position where the motion assembly 61 drives the locking assembly 63 to secure the workpiece 2008 to the part 2002, and the screw feeding station 612 may be another position where the motion assembly 61 drives the locking assembly 63 to suck the screw. In at least one embodiment, the automatic locking device 100 further includes a screw feeding assembly 90 (as shown in FIG. 1). The screw feeding assembly 90 is arranged on the frame 55 of the rotating mechanism 50, and is used to supply the screw to the locking assembly 63.

The motion assembly 61 is a 3-axis linear module, which is mounted on the platform 70 by the supporting rack 80. The locking assembly 63 is an electric screwdriver. The detection assembly 62 includes at least one image-capturing unit 621 and at least one light source 622. Each image-capturing unit 621 and each light source 622 is arranged on the motion assembly 61. Each image-capturing unit 621 is used to capture images of the part 2002, and each light source 622 is used to illuminate the part 2002. In at least one embodiment, the detection assembly 62 may include two image-capturing units 621 and two light sources 622, and each of the two image-capturing units 621 corresponds to one of the two light sources 622. The image-capturing unit 621 may be a camera.

Figure 12:
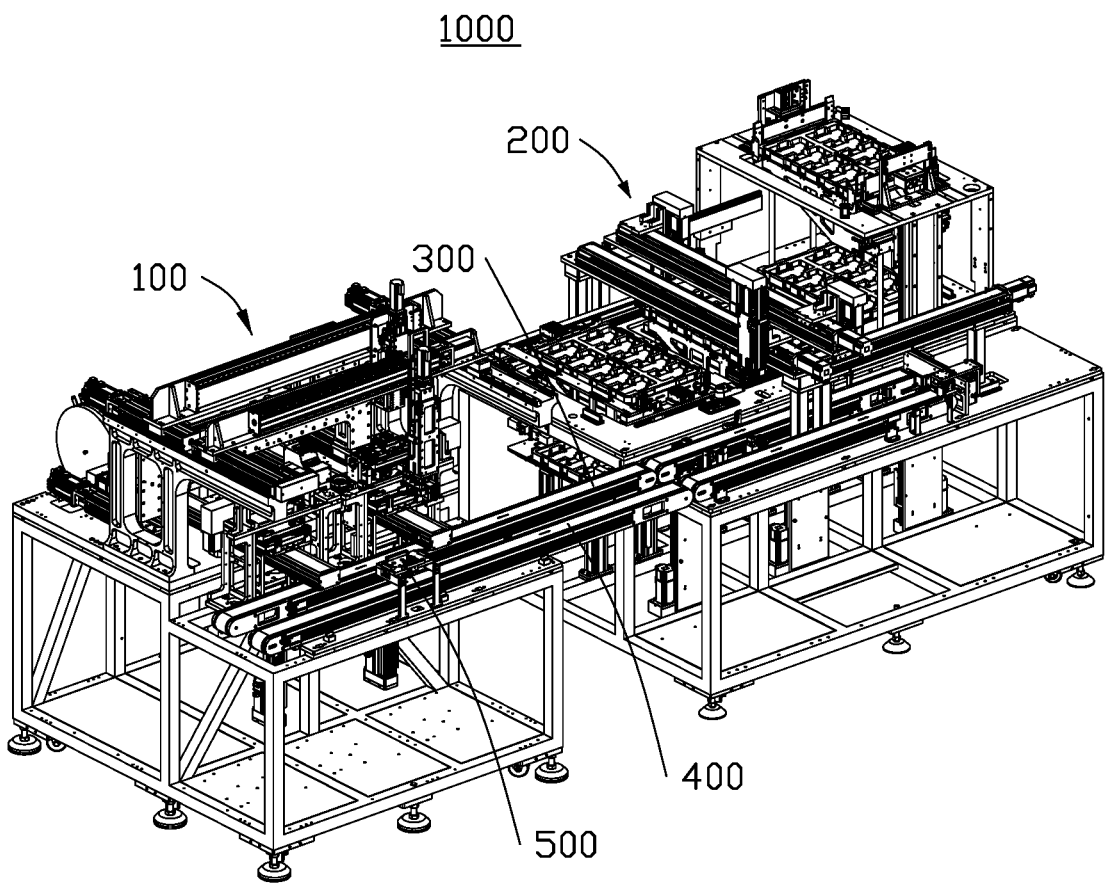
FIG. 12 is a perspective view of an assembling apparatus according to an embodiment of the present disclosure.

Referring to FIG. 12, an assembling apparatus 1000 is further provided according to the present disclosure. The assembling apparatus 1000 is used to assemble the part 2002 to the workpiece 2008. The assembling apparatus 1000 includes at least one of the automatic locking device 100 mentioned above, a storage device 200, a loading conveyer 300, and an unloading conveyer 400.

The storage device 200 is used to store the workpiece 2008 and the assembled product 1. The loading conveyer 300 is adjacent to the storage device 200 and the automatic locking device 100, and is used to transport the workpiece 2008 from the storage device 200 to the automatic locking device 100. The unloading conveyer 400 is adjacent to the storage device 200 and the automatic locking device 100. The unloading conveyer 400 and the loading conveyer 300 are parallel to each other. The unloading conveyer 400 is used to transport the assembled product 1 from the automatic locking device 100 to the storage device 200. Therefore, the automatic assembly is realized, which may reduce the workforce, lower the labor cost, and improve the assembling accuracy.

Figure 13:
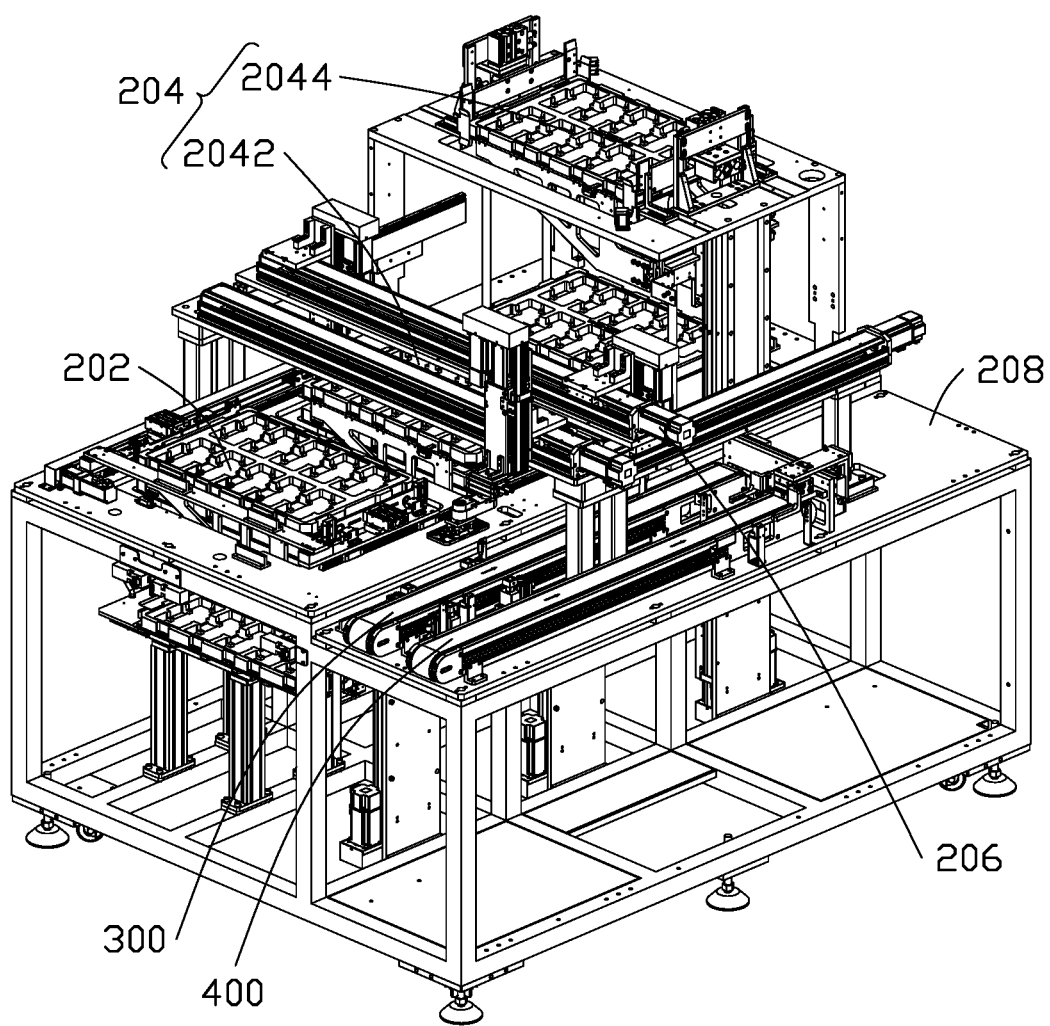
FIG. 13 is a perspective view of a storage device of the assembling apparatus of FIG. 12.

Referring to FIG. 13, the storage device 200 includes a supply mechanism 202, a storage mechanism 204, a moving assembly 206, and a table 208. The supply mechanism 202 is mounted on the table 208, and is used to supply at least one workpiece 2008 (for example, a tray of workpieces 2008) to the automatic locking device 100. The storage mechanism 204 is mounted on the table 208 and adjacent to the supply mechanism 202. The storage mechanism 204 is used to store at least one assembled product 1 (for example, a tray of assembled products 1). The moving assembly 206 is mounted on the table 208 and adjacent to the supply mechanism 202, the storage mechanism 204, the loading conveyer 300, and the unloading conveyer 400. The moving assembly 206 is used to transport the workpiece 2008 from the supply mechanism 202 to the loading conveyer 300 and further transport the assembled product 1 from the unloading conveyer 400 to the storage mechanism 204.

The storage mechanism 204 includes a first storage container 2042 and a second storage container 2044. The first storage container 2042 and the second storage container 2044 are spaced from each other and mounted on the table 208. The first storage container 2042 is used to store the qualified assembled product 1, and the second storage container 2044 is used to store the unqualified assembled product 1. The moving assembly 206 may include a 3-axis linear module and a 2-axis linear module. The 3-axis linear module corresponds to the storage mechanism 204, and is used to place the assembled product 1 from the unloading conveyer 400 into the first storage container 2042 or the second storage container 2044 when moving in the first direction, the second direction, and the third direction. The 2-axis linear module corresponds to the supply mechanism 202, and is used to place the workpiece 2008 from the supply mechanism 202 on the loading conveyer 300 when moving in the first direction and the second direction. Each of the loading conveyer 300 and the unloading conveyer 400 may include a conveyer belt.

Referring to FIG. 12, the assembling apparatus 1000 further includes a positioning mechanism 500. The positioning mechanism 500 is adjacent to the loading and unloading mechanism 30, and is used to position the workpiece 2008 provided by the loading conveyer 300 and position the assembled product 1, so that the loading and unloading mechanism 30 can place the workpiece 200B from the positioning mechanism 500 onto the fixture assembly 22, and can also place the assembled product 1 from the positioning mechanism 500 onto the unloading conveyer 400.

Figure 14:
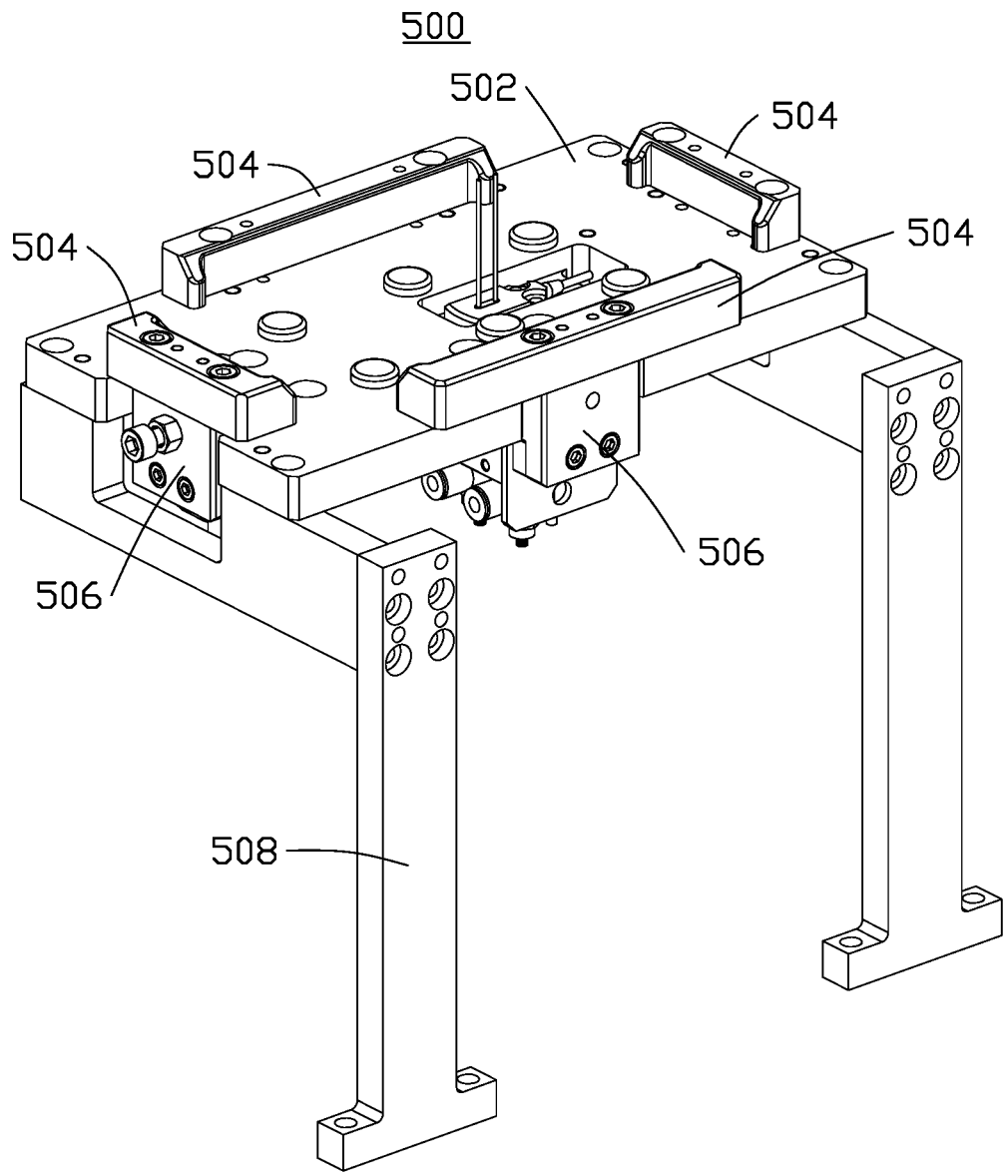
FIG. 14 is a perspective view of a positioning mechanism of the assembling apparatus of FIG. 12.

Referring to FIG. 14, the positioning mechanism 500 includes a positioning plate 502, at least one third positioning member 504, and at least one positioning driver 506. The positioning plate 502 is located above the unloading conveyer 400 or above the platform 70 by two support posts 508. The positioning driver 506 is located on and fixed to the positioning plate 502. The positioning driver 506 is used to drive the third positioning member 504 to move, thereby positioning the workpiece 200B. For example, the positioning mechanism 500 includes four third positioning members 504 and two positioning drivers 506. Two of the four third positioning members 504 are fixed at different positions on the positioning plate 502, the other two of the four third positioning members 504 are connected to the two positioning drivers 506. The two positioning drivers 506 are used to drive the corresponding third positioning members 504 to move in the second direction and the third direction, thereby positioning the workpiece 200B in the second direction and the third direction. The positioning driver 506 may be a linear cylinder, and may be located above or below the positioning plate 502.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An automatic locking device for assembling a part to a workpiece, the automatic locking device comprising:
   a feeding mechanism configured to provide the part;
   a fixture mechanism adjacent to the feeding mechanism, the fixture mechanism comprising a sliding assembly and a fixture assembly arranged on the sliding assembly, the fixture assembly configured to hold the part provided by the feeding mechanism;
   a loading and unloading mechanism adjacent to the fixture mechanism, the loading and unloading mechanism configured to load the workpiece onto the fixture mechanism;
   a lifting mechanism adjacent to the fixture mechanism, the sliding assembly configured to drive the fixture assembly to slide to be above the lifting mechanism, the lifting mechanism configured to lift the fixture assembly together with the part and the workpiece;
   a rotating mechanism arranged above the lifting mechanism, the rotating mechanism configured to rotate the fixture assembly lifted by the lifting mechanism; and
   a locking mechanism arranged above the rotating mechanism, the locking mechanism configured to lock the part to the workpiece after the part and the workpiece are rotated by the rotating mechanism, and the loading and unloading mechanism further configured to unload the workpiece locked with the part from the fixture mechanism.

2. The automatic locking device of claim 1, wherein the fixture assembly comprises:
   a base arranged on the sliding assembly;
   a supporter detachably disposed on the base; and
   a carrier detachably disposed on the supporter, wherein the carrier comprises a profiling block, and the profiling block is configured to support and position the part on the carrier.

3. The automatic locking device of claim 2, wherein the lifting assembly comprises a lifting driver and a lifting rod connected to the lifting driver, and the lifting driver is located below the sliding assembly;
   the base defines an avoidance hole, the lifting driver is configured to drive the lifting rod to extend through the avoidance hole of the base, thereby allowing the lifting rod to be abutted against the base and to lift the supporter and the carrier.

4. The automatic locking device of claim 2, wherein a protrusion is formed on the carrier;
   the rotating mechanism comprises:
   a cover plate arranged above the lifting mechanism, wherein the cover plate defines an avoidance hole, the protrusion is configured to extend through the avoidance hole of the cover plate;
   a latch driver arranged on a side of the cover plate away from the lifting mechanism;
   a latch slidably arranged on the side of the cover plate away from the lifting mechanism, wherein the latch is connected to the latch driver, the latch driver is configured to drive the latch to move, and the latch is configured to cooperate with the protrusion which extends through the avoidance hole of the cover plate so that the carrier is fixed to the rotating mechanism; and
   a rotating driver arranged above the lifting mechanism, wherein the rotating driver is connected to the cover plate and configured to rotate the cover plate, the latch driver, the latch, and the carrier.

5. The automatic locking device of claim 4, wherein the protrusion has a T-shaped cross section, a gap is defined between the protrusion and the cover plate when the protrusion extends through the avoidance hole of the cover plate, and the latch is configured to insert into the gap to fix the carrier to the cover plate.

6. The automatic locking device of claim 2, wherein the carrier comprises a bearing plate and a movable plate, the bearing plate is movably connected to the movable plate, and the bearing plate faces the rotating mechanism;
   the bearing plate defines a receiving hole, and the profiling block is received in the receiving hole and elastically connected to the movable plate;
   the supporter comprises a guiding plate, a mounting plate, a movable pin, and an elastic member, the guiding plate is connected to the mounting plate, the guiding plate is located between the mounting plate and the movable plate; the movable pin comprises a first end and a second end opposite to the first end, the first end is resisted against the mounting plate by the elastic member, the second end movably extends through the guiding plate, the movable plate, the bearing plate, and the profiling block and further protrudes from the profiling block, and the second end is configured to position the part and the workpiece.

7. The automatic locking device of claim 1, wherein the feeding mechanism comprises:
   a holder configured to hold a material roll formed by winding a material belt;
   a film removing assembly arranged on a side the holder, wherein the holder is configured to feed the material belt to the film removing assembly, and the film removing assembly is configured to remove a protective film of the material belt to expose the part on a bottom belt;
   a transfer assembly adjacent to the film removing assembly;
   a visual assembly arranged on the transfer assembly, wherein the visual assembly is configured to detect a position of the part on the film removing assembly;
   an adjustment assembly arranged on the transfer assembly and adjacent to the visual assembly, wherein the adjusting assembly is configured to suck the part according to the position of the part on the film removing assembly, and the transfer assembly is configured to drive the adjusting assembly to place the part on the fixture assembly; and
   a correction assembly adjacent to the transfer assembly, wherein the correction assembly is configured to detect a position of the part suck by the adjusting assembly, and the adjusting assembly is further configured to adjust the part according to the position of the part suck by the adjusting assembly.

8. The automatic locking device of claim 7, wherein the film removing assembly comprises:
   a support plate adjacent to the holder;
   a guiding member; and
   a support surface, a motion cavity, and a receiving groove each arranged on the support plate, wherein the support surface, the motion cavity, and the receiving groove are successively arranged between the holder and the guiding member;
   wherein the support surface is configured to support the material belt from the material roller on the holder, causing the material belt to extend through the motion cavity and the protective film to be removed from the material belt and bent backward, the motion cavity comprises a ceiling, and the ceiling is configured to support the protective film which is bent backward; the receiving groove is configured to support the bottom belt and the part on the bottom belt, thereby allowing the adjusting assembly to suck the part on the bottom belt, and the guiding member is configured to guide the bottom belt without the part to a recycle container.

9. The automatic locking device of claim 8, wherein the film removing assembly further comprises:
   a deflection module arranged on the support plate and located above the support surface, wherein the deflection module is configured to change a moving direction of the protective film which is bent backward; and
   a deflection driver arranged on the support plate and located below the support surface, wherein the deflection driver is configured to pull the protective film after the moving direction of the protective film is changed by the deflection module,
   wherein the deflection module comprises a first roller, a second roller, and a third roller, each of the first roller, the second roller, and the third roller is mounted on the support plate and located above the support surface, the first roller is located above the second roller, and the second roller is located above the third roller, the first roller is configured to guide the protective film which is bent backward to the second roller, the second roller is configured to guide the protective film to the second third roller, and the third roller is configured to guide the protective film to another recycle container;
   an axis of the first roller is perpendicular to the moving direction of the protective film, an axis of the second roller is inclined with the axis of the first roller, and an axis of the third roller is parallel to the moving direction of the protective film.

10. The automatic locking device of claim 7, wherein the adjusting assembly comprises:
    an adjusting driver arranged on the transfer assembly; and
    a suction nozzle connected to the adjusting driver, wherein the suction nozzle is configured to suck the part, and the adjusting driver is configured to move the suction nozzle in a first direction and rotate the suction nozzle around an axis parallel to the first direction.

11. The automatic locking device of claim 7, wherein the visual assembly comprises an image-capturing unit and a light source, each of the image-capturing unit and the light source of the visual assembly is arranged on the transfer assembly, the image-capturing unit of the visual assembly is configured to capture an image of the part, and the light source of the visual assembly is configured to illuminate the part; and
    the correction assembly comprises an image-capturing unit and a light source, each of the image-capturing unit and the light source of the correction assembly is adjacent to the transfer assembly, the image-capturing unit of the correction assembly is configured to capture an image of the part, and the light source of the correction assembly is configured to illuminate the part.

12. The automatic locking device of claim 1, wherein the locking mechanism comprises:
    a motion assembly movable between a screwing station and a screw feeding station;
    a detection assembly arranged on the motion assembly, wherein the detection assembly is configured to detect a position of a screw at the screwing station and a position of the part on the fixture assembly which is rotated by the rotating mechanism; and
    a locking assembly arranged on the motion assembly, wherein the locking assembly is configured to suck the screw at the screw feeding station according to the position of the screw, and further configured to lock the part to the workpiece by the screw at the screwing station according to the position of the part on the fixture assembly.

13. The automatic locking device of claim 12, wherein the detection assembly comprises an image-capturing unit and a light source, each of the image-capturing unit and the light source is arranged on the motion assembly, the image-capturing unit is configured to capture an image of the part, and the light source is configured to illuminate the part.

* * * * *